United States Patent
Nakashima

(10) Patent No.: US 8,482,746 B2
(45) Date of Patent: Jul. 9, 2013

(54) MULTIFUNCTION IMAGE PROCESSING APPARATUS AND METHOD OF CONTROLLING THE MULTIFUNCTION IMAGE PROCESSING APPARATUS

(75) Inventor: Kousuke Nakashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 12/035,952

(22) Filed: Feb. 22, 2008

(65) Prior Publication Data

US 2008/0204784 A1    Aug. 28, 2008

(30) Foreign Application Priority Data

Feb. 23, 2007    (JP) .................................. 2007-044005

(51) Int. Cl.
*G06F 3/12*    (2006.01)
(52) U.S. Cl.
USPC ......................................................... 358/1.13
(58) Field of Classification Search
None
See application file for complete search history.

(56) References Cited

U.S. PATENT DOCUMENTS

2003/0025927 A1*    2/2003    Hino et al. ................... 358/1.13
2006/0044580 A1*    3/2006    Maeda ............................ 358/1.9

FOREIGN PATENT DOCUMENTS

| JP | 5-246111 | A | 9/1993 |
| JP | 6-318998 | A | 11/1994 |
| JP | 09-294174 | A | 11/1997 |
| JP | 2001-285557 | A | 10/2001 |
| JP | 2002-314781 | A | 10/2002 |

OTHER PUBLICATIONS

Yoshida, Machine Translation of JP06-318998, Nov. 1994.*

* cited by examiner

*Primary Examiner* — Jeremiah Bryar
(74) *Attorney, Agent, or Firm* — Carter, DeLuca, Farrell & Schmidt LLP

(57) ABSTRACT

A multifunction image processing apparatus having a plurality of functions including at least an image transmission function includes a job execution unit executing a job for any of the functions; an output unit outputting result information after execution of a job for the image transmission function, the result information containing information indicating a result of the execution; a macro execution unit causing the job execution unit to execute a job on the basis of macro data indicating the at least one of the plurality of functions and order of executing the at least one of the plurality of functions; and a control unit causing the output unit not to output the result information after the job is executed if the job is for executing the image transmission function and the macro data indicates that there is a function to be executed after the execution of the image transmission function.

10 Claims, 9 Drawing Sheets

FIG. 3

02/13 2007 TUE 10:14                                                001

```
        ******************************
        *Transmission Report*
        ******************************

Serial No.    0422
Dept. ID      0001
Start Time    02/13 10:12
Page(s)       5
Subject       Monthly Report
Unsent        ------
Sent          a@com
              044 123 4567

Error         ------
```

FIG. 6

601   <?xml version = "1.0" encoding = "UTF - 8"?>
602   <macro>
603    <temporary_box>99</temporary_box>
604    <read_document>
605     <density> + 1 </density>
606     <duplex>true</duplex>
607     <scaling>100%</scaling>
608    </read_document>
609    <combine_documents>
610     <document_id>0001</document_id>
611    </combine_documents>
612    <send>
613     <emai>a@coml</emai>
614     <file_format>encrypted PDF</file_format>
615    </send>
616   </macro>

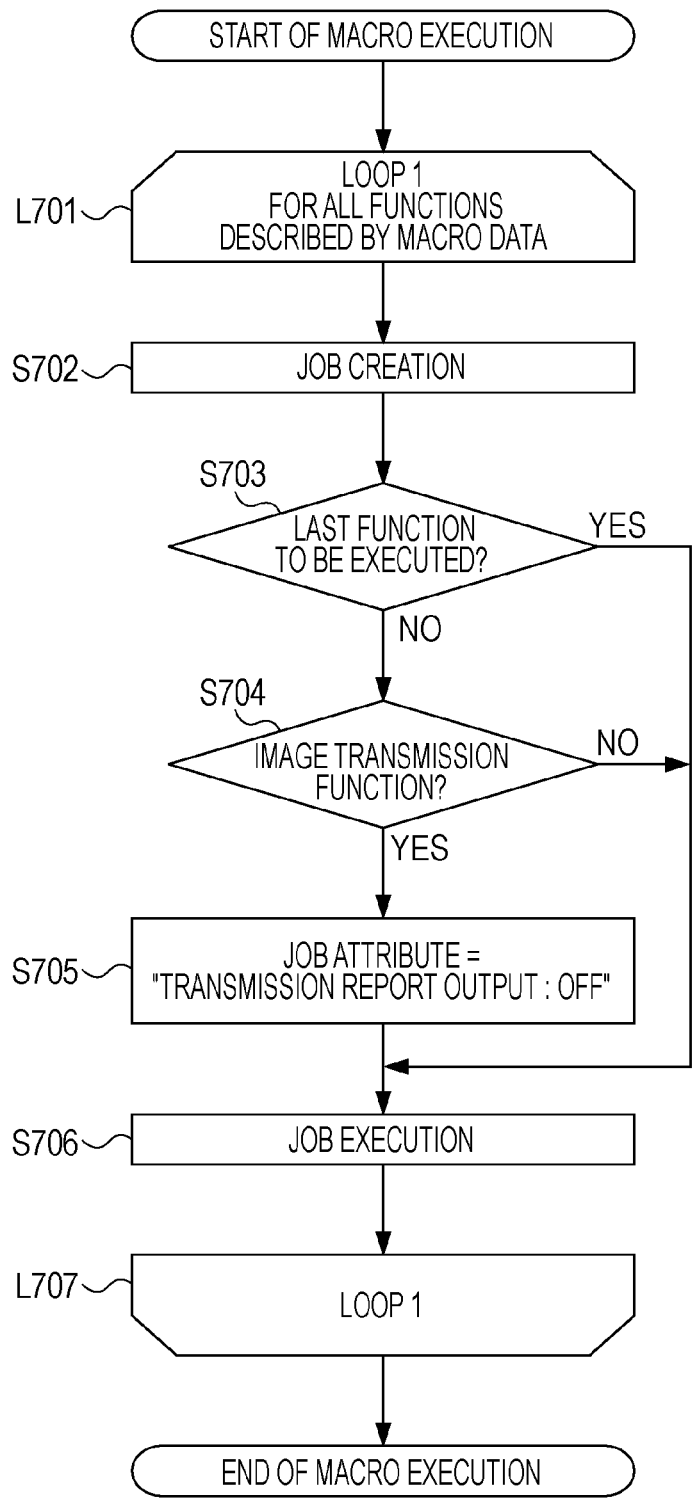

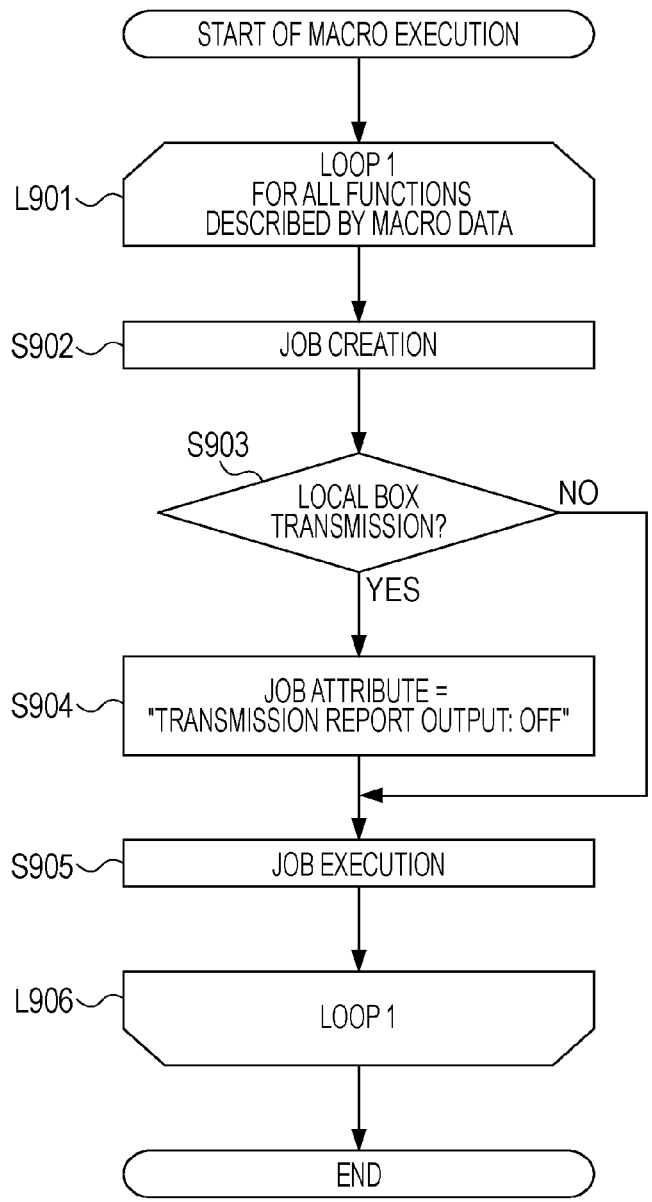

MULTIFUNCTION IMAGE PROCESSING APPARATUS AND METHOD OF CONTROLLING THE MULTIFUNCTION IMAGE PROCESSING APPARATUS

BACKGROUND OF THE INVENTION

1. Field of the Invention

The present invention relates to a multifunction image processing apparatus capable of executing macros.

2. Description of the Related Art

A digital multifunction peripheral (hereinafter referred to as MFP) capable of executing a plurality of functions, such as copying, scanning, printing, and transmission, has a macro function which allows execution of a macro defining one or a combination of functions provided by the MFP (e.g., see Japanese Patent Laid-Open No. 5-246111). In such an MFP, the types of operation keys sequentially pressed and the sequence of presses are registered as a macro using key codes that are generated in response to presses of operation keys. The MFP executes the registered macro when a call key corresponding thereto is pressed.

There are existing techniques in which a transmission report showing a result of facsimile transmission is printed after the execution thereof (e.g., see Japanese Patent Laid-Open No. 6-318998). With such a transmission report, the user can determine whether the transmission has been properly executed.

For example, there may be a case in which an MFP having a macro function and capable of outputting a transmission report executes a macro that defines a process including the following steps:

(1): Scan a document and store the resulting image in a storage unit of the MFP;

(2): Combine the image stored in step (1) with image data prestored in the storage unit; and (3): Attach the composite image data obtained in step (2) to an email message and send it to a predetermined destination.

When the macro indicates that step (1) is to be performed by the transmission function of the MFP, a transmission report for step (1) is printed upon completion of step (1). Then, upon completion of step (3), a transmission report for step (3) is also printed. Generally, the user who has given instructions to execute the macro is not interested in results obtained while execution of the macro is in progress. Therefore, the transmission report printed upon completion of step (1) is not necessary. However, if the macro is simply executed, such an unnecessary transmission report is printed by the MFP. This is not only inconvenient to the user, but also imposes unnecessary printing costs on the user.

SUMMARY OF THE INVENTION

The present invention provides a multifunction image processing apparatus capable of preventing unnecessary transmission reports from being output.

According to an aspect of the present invention, a multifunction image processing apparatus having a plurality of functions including at least an image transmission function includes a job execution unit configured to execute a job for any of the plurality of functions; an output unit configured to output result information after the job execution unit executes a job for the image transmission function, the result information containing information indicating a result of the execution of the job; a macro execution unit configured to cause the job execution unit to execute a job on the basis of macro data indicating at least one of the plurality of functions and order of executing the at least one of the plurality of functions; and a control unit configured to cause the output unit not to output the result information after the job is executed if the job is for executing the image transmission function and the macro data indicates that there is a function to be executed after the execution of the image transmission function.

According to another aspect of the present invention, a multifunction image processing apparatus having a plurality of functions including at least an image transmission function includes a job execution unit configured to execute a job for any of the plurality of functions; an output unit configured to output result information after the job execution unit executes a job for the image transmission function, the result information containing information indicating a result of the execution of the job; a macro execution unit configured to cause the job execution unit to execute a job on the basis of macro data indicating at least one of the plurality of functions and order of executing the at least one of the plurality of functions; a storage unit configured to store image data; and a control unit configured to cause the output unit not to output the result information after the job is executed if the job is for the image transmission function and for executing image transmission directed to the storage unit.

The present invention makes it possible to prevent unnecessary transmission reports from being printed. This eliminates inconvenience to the user and minimizes unnecessary printing costs.

Further features of the present invention will become apparent from the following detailed description of exemplary embodiments with reference to the attached drawings.

BRIEF DESCRIPTION OF THE DRAWINGS

FIG. 3 shows an output example of a transmission report.

FIG. 6 shows exemplary macro data described in XML.

FIG. 7 is a flowchart illustrating an exemplary process of a macro execution module in a first exemplary embodiment of the present invention.

FIG. 9 is a flowchart illustrating an exemplary process of a macro execution module in a second exemplary embodiment of the present invention.

DESCRIPTION OF THE EMBODIMENTS

First Exemplary Embodiment (Configuration of MFP)

Exemplary embodiments of the present invention will now be described in detail with reference to the drawings.

Figure 1:
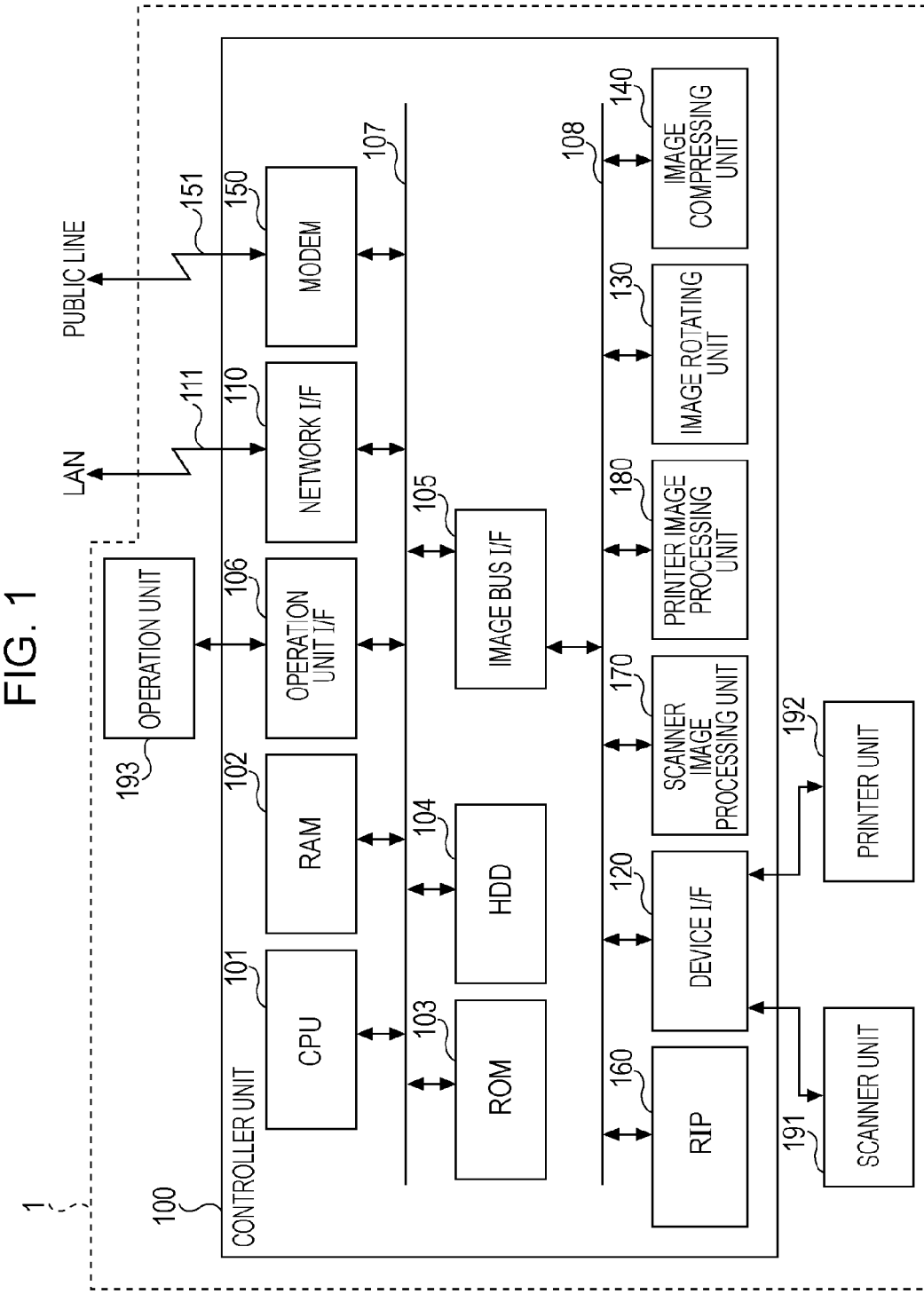
FIG. 1 is a block diagram illustrating an exemplary configuration of an MFP according to an exemplary embodiment of the present invention.

FIG. 1 is a block diagram illustrating a configuration of a digital MFP which is an exemplary multifunction image processing apparatus of the present exemplary embodiment.

A digital MFP (hereinafter referred to as MFP) 1 has a plurality of functions, such as a copying function, a printing function, a box function, and an image transmission function. A detailed description of each function will be given later.

Referring to FIG. 1, a controller unit 100 which controls the entire MFP 1 is connected to a scanner unit 191 serving as an image input device and to a printer unit 192 serving as an image output device. The scanner unit 191 optically reads a document image and generates image data corresponding to the document image. The printer unit 192 forms an image on a sheet on the basis of the image data. Although the printer unit 192 uses electrophotography to perform image formation in the present exemplary embodiment, another image forming technique, such as an inkjet technique may be used.

The controller unit 100 includes a central processing unit (CPU) 101 which boots an operating system (OS) using a boot program stored in a read-only memory (ROM) 103. The CPU 101 performs various processes on the OS by executing application programs stored in a hard disk drive (HDD) 104. Among the application programs are those for realizing the copying function, printing function, box function, and image transmission function described above. A program for realizing a network function which allows data transmission to and from external devices may also be an example of the application programs.

A random-access memory (RAM) 102 provides a work area for the CPU 101. The RAM 102 also provides an image memory area for temporary storage of image data. The HDD 104 is capable of storing image data as well as the application programs described above.

Components connected to the CPU 101 via a system bus 107 include the ROM 103, RAM 102, an operation unit interface (I/F) 106, a network I/F 110, a modem 150, and an image bus I/F 105.

The operation unit I/F 106 serves as an interface with an operation unit 193 which includes a touch panel and hard keys, such as keys on a numeric keypad. Image data to be displayed in the operation unit 193 is output from the operation unit I/F 106 to the operation unit 193. Information input to the operation unit 193 by the user is transmitted from the operation unit I/F 106 to the CPU 101.

The network I/F 110 is connected to a local area network (LAN) 111, through which the network I/F 110 inputs and outputs information from and to devices on the LAN 111.

The modem 150 is connected to a public line 151, through which the modem 150 inputs and outputs information.

The image bus I/F 105 connects the system bus 107 with an image bus 108, through which image data is transferred at high speed. Thus, the image bus I/F 105 serves as a bus bridge for conversion of data structure.

Components connected to the image bus 108 include a raster image processor (RIP) 160, a device I/F 120, a scanner image processing unit 170, a printer image processing unit 180, an image rotating unit 130, and an image compressing unit 140.

The RIP 160 expands page description language (PDL) code to a bitmapped image.

The scanner unit 191 and the printer unit 192 are connected to the device I/F 120, which converts image data received from the scanner unit 191 into image data to be transmitted to the printer unit 192.

The scanner image processing unit 170 corrects, processes, and edits image data input from the scanner unit 191.

The printer image processing unit 180 performs correction and resolution conversion on image data to be output to the printer unit 192.

The image rotating unit 130 rotates image data. The image compressing unit 140 compresses multivalued image data into Joint Photographic Experts Group (JPEG) data and binary image data into Joint Bi-level Image Experts Group (JBIG) data, Modified Modified Read (MMR) data, or modified Huffman coding (MH) data. Additionally, the image compressing unit 140 decompresses the compressed data.

Image data read by the scanner unit 191 can be subjected to predetermined image processing by the scanner image processing unit 170 and printed by the printer unit 192. Thus, the MFP 1 realizes the copying function described above.

Additionally, PDL code included in print data received from a client computer (not shown) via the LAN 111 can be expanded by the RIP 160 to a bitmapped image, subjected to predetermined image processing by the printer image processing unit 180, and printed by the printer unit 192. Thus, the MFP 1 realizes the printing function described above.

Moreover, image data read by the scanner unit 191 can be subjected to predetermined image processing by the scanner image processing unit 170 and stored in a predetermined storage area in the HDD 104. Thus, the MFP 1 realizes the box function described above. The box function allows editing of image data stored in the HDD 104 and also allows generation of combined or composite image data from a plurality of image data items stored in the HDD 104. Hereinafter, an image data storage area in the HDD 104 is referred to as "box".

Image data read by the scanner unit 191 can be subjected to predetermined image processing by the scanner image processing unit 170 and transmitted to any terminal (not shown) by specifying its address. Thus, the MFP 1 realizes the image transmission function described above. The terminal (not shown) to which such image data is to be transmitted may be connected to the MFP 1 either via the LAN 111 or the public line 151. The image transmission function allows transmission of image data via the network I/F 110 to a specified destination on the LAN 111 or via the modem 150 to a specified destination on the public line 151. The image transmission function supports a plurality of image transmission protocols and selects an appropriate image transmission protocol to be used according to the destination to which image data is to be transmitted. With the image transmission function, it is possible to specify a designated storage area in the HDD 104 as a destination of image data transmission.

In the MFP 1, image data read by the scanner unit 191 can be stored in the HDD 104 either by the box function or the image transmission function.

The image transmission function also allows transmission of image data prestored in the HDD 104 by the box function or the image transmission function to a destination.

Hereinafter, execution of a function provided by the MFP 1 is referred to as "execution of a job". For example, if the MFP 1 executes the image transmission function, this is expressed as "the MFP 1 executes an image transmission job".

(Software Configuration for Image Transmission Function)

Figure 2:
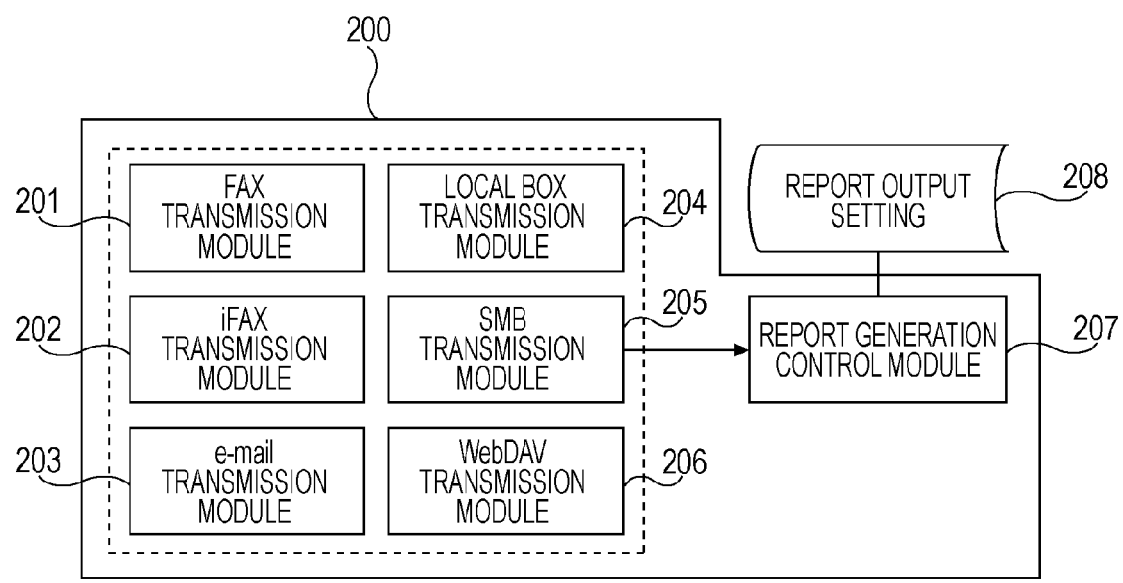
FIG. 2 illustrates an exemplary software configuration for an image transmission function provided by the MFP.

FIG. 2 illustrates an exemplary software configuration for the image transmission function of the MFP 1 according to the present exemplary embodiment. An image transmission module 200 is a software module for realizing the image transmission function and is stored in the HDD 104. The image transmission module 200 in the HDD 104 is loaded into the RAM 102 and executed by the CPU 101. This allows the MFP 1 to realize the image transmission function.

The image transmission function of the MFP 1 provides a plurality of transmission modes using different image transmission protocols. The transmission modes include "facsimile" using a public line, "e-mail transmission" for transmitting image data as an attachment to an electronic mail (e-mail) message, "Internet facsimile", "SMB transmission" using the Service Message Block (SMB) protocol, "WebDAV transmission" using the Distributed Authoring and Versioning protocol for the WWW (WebDAV), and "local box transmission" for storing image data in the internal HDD 104 of the MFP 1.

The image transmission module 200 include a plurality of program modules (i.e., a FAX transmission module 201, an iFAX transmission module 202, an e-mail transmission module 203, a local box transmission module 204, an SMB transmission module 205, and a WebDAV transmission module 206) corresponding to the plurality of transmission modes described above. The image transmission module 200 further includes a report generation control module 207 for generating a transmission report to be printed after the execution of image transmission.

After the execution of an image transmission job, the report generation control module 207 controls the output of a transmission report according to a report output setting 208. The user of the MFP 1 or an administrator can specify the report output setting 208 using the operation unit 193. The report output setting 208 can be selected from one of the following options: "Output a transmission report after execution of an image transmission job regardless of the result of the image transmission", "Output a transmission report only in case of error in image transmission", and "Don't output a transmission report". The report output setting 208 is stored in the HDD 104. The report output setting 208 is a common setting that applies to all the transmission modes provided by the image transmission function.

(Transmission Report)

FIG. 3 shows an exemplary transmission report according to the present exemplary embodiment.

The content described in the transmission report of FIG. 3 is generated by the report generation control module 207. When information generated by the report generation control module 207 is printed by the printer unit 192, a transmission report such as that shown in FIG. 3 can be obtained.

(Macro Data)

Next, macro data of the present embodiment will be described. Macro data 403 (see FIG. 4) is data that describes one or a combination of the functions (e.g., copying, printing, image transmission, and box) provided by the MFP 1. The functions described by the macro data 403 may include those provided by an apparatus other than the MFP 1 and may be executed either simultaneously or sequentially. For sequential execution, the order of functions to be executed may be defined by the macro data 403. The functions described by the macro data 403 are called and executed as specified by the description. The macro data 403 is stored in the HDD 104 of the MFP 1. A plurality of macros may be registered in the MFP 1. In this case, a plurality of macros is stored in the HDD 104.

FIG. 6 shows macro data of the present exemplary embodiment, the macro data being described in Extensible Markup Language (XML). Referring to FIG. 6, the tag in line 601 indicates XML version and character code. The tags in lines 602 and 616 indicate that macro data is presented. The macro data indicates that the following functions (1) to (3) are to be executed in the order of (1), (2), and (3).

(1) Use the image transmission function to store document image data in the HDD 104 (increase the density of the scanned document image by one level; scan both surfaces of the document; and set the scaling of the scanned document image to 100%) (see lines 604 to 608).

(2) Use the box function to combine the image data stored in the HDD 104 in step (1) with image data that is prestored in the HDD 104 and identifiable with document ID "0001" (see lines 609 to 611).

(3) Use the image transmission function to send the image data generated in step (2) in encrypted portable document format (PDF) to the destination at a@com by e-mail (see lines 612 to 615).

Line 603 indicates a storage area in the HDD 104 to be used when a need for the MFP 1 to temporarily store image data arises in executing functions (1) to (3). Specifically, line 603 indicates that the storage area with "box No. 99" is to be used.

In the macro data of FIG. 6, various set values in each function are described as subelements of elements of the function.

Figure 4:
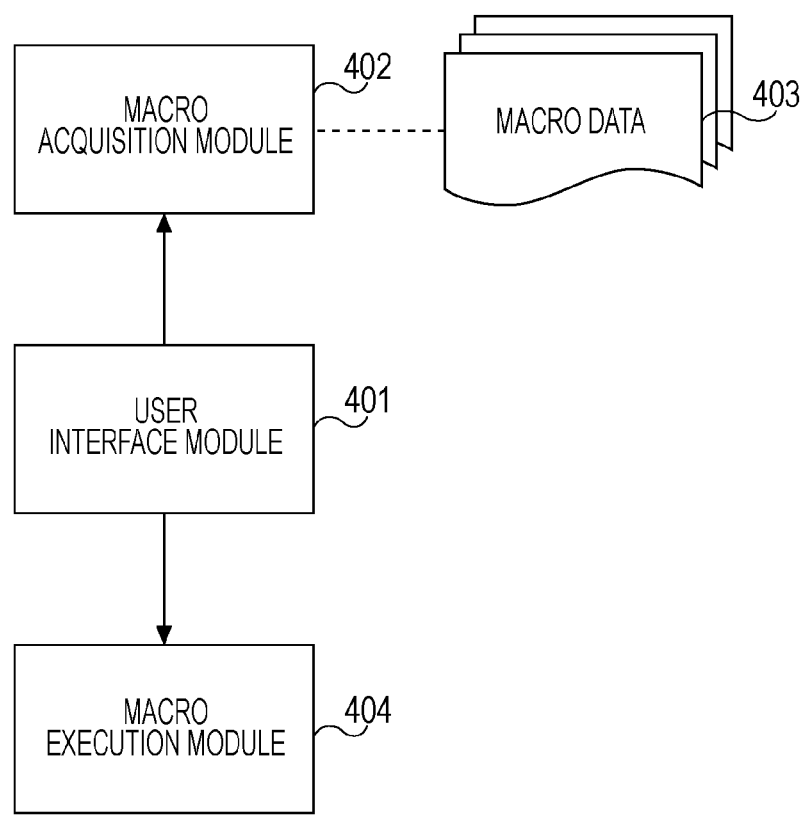
FIG. 4 illustrates an exemplary software configuration related to macro execution in the MFP.

FIG. 4 illustrates an exemplary software configuration related to macro execution in the MFP 1 of the present exemplary embodiment.

A user interface module 401, a macro acquisition module 402, and a macro execution module 404 are stored in the HDD 104, loaded into the RAM 102, and executed by the CPU 101.

The user interface module 401 is related to the operation unit 193 and accepts an instruction from the user. In the present exemplary embodiment, according to an instruction from the user, the user interface module 401 performs control for displaying, on the operation unit 193, the macro data 403 stored in the HDD 104 of the MFP 1. Additionally, when the user operates the operation unit 193 to send an instruction to the user interface module 401 to execute specific macro data, the user interface module 401 passes the specified macro data to the macro execution module 404 according to the instruction.

On the basis of an instruction from the user interface module 401, the macro acquisition module 402 acquires the macro data 403 stored in the HDD 104.

On the basis of an instruction from the user interface module 401, the macro execution module 404 analyzes the macro data 403 acquired by the macro acquisition module 402 and controls the controller unit 100 such that the MFP 1 executes each function described by the macro data 403. A process performed by the macro execution module 404 will be described in detailed later.

(Macro Data List Screen)

Figure 5:
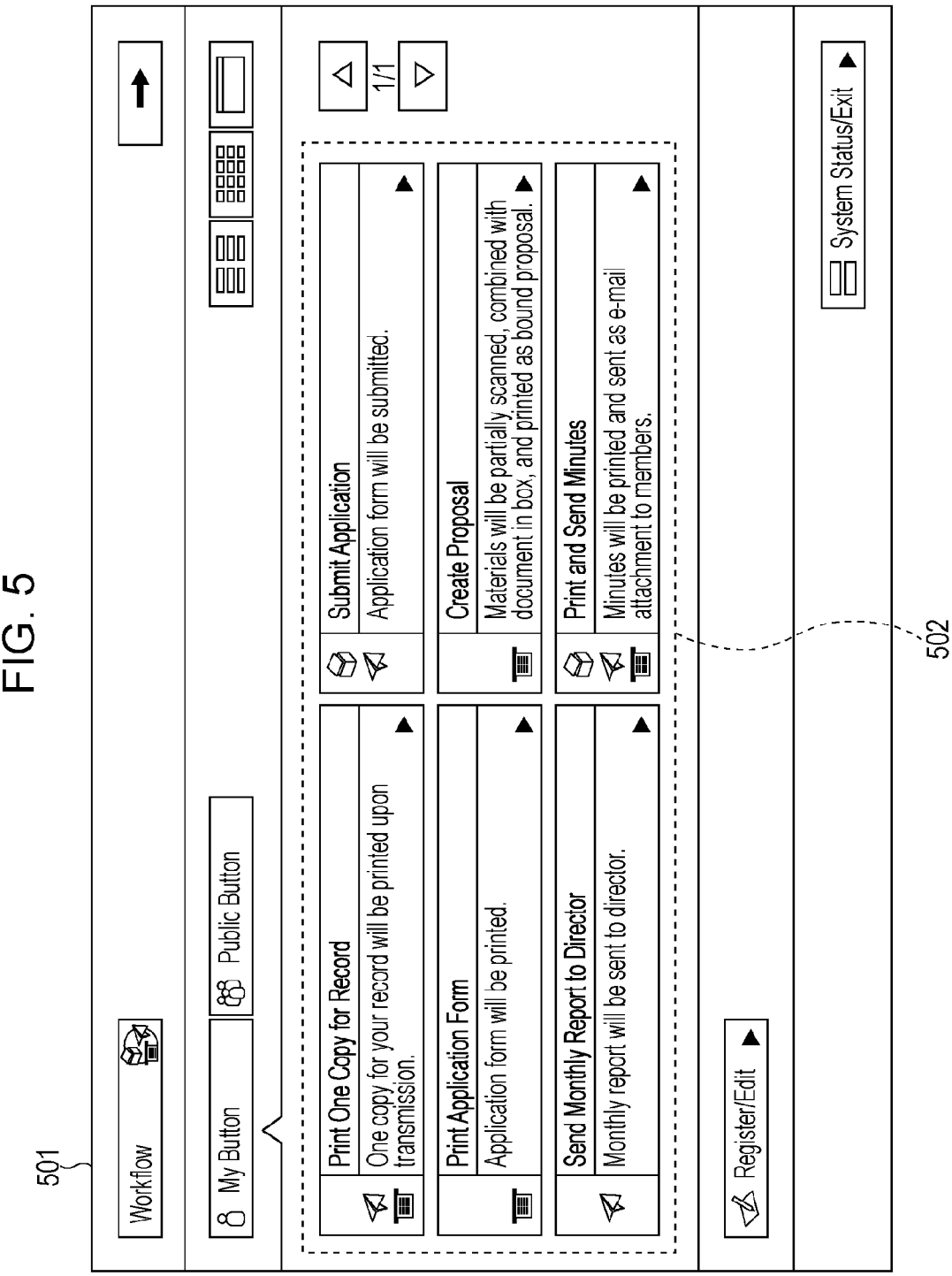
FIG. 5 illustrates an exemplary operation screen shown on a display of an operation unit of the MFP and used for calling macro data.

FIG. 5 illustrates an exemplary operation screen shown on a display of the operation unit 193 of the MFP 1 and used for calling macro data.

A list screen 501 displays a list of a plurality of macro data items stored in the MFP 1. A plurality of macro call buttons used for calling macros are arranged in a display area 502. Each macro call button in the display area 502 corresponds to one item of the macro data 403 registered in the MFP 1.

Although buttons corresponding to respective items of the macro data 403 are displayed in the present exemplary embodiment, the present invention is not limited to this. For example, a fixed display position may be stored for each item of the macro data 403 and if an item of the macro data 403 does not exist, the corresponding button may not be displayed or may be shaded at the display position stored for this item of the macro data 403.

On the list screen 501 displayed in the operation unit 193, when the user presses one of the buttons in the display area 502, the controller unit 100 starts executing macro data corresponding to the pressed button. Alternatively, the controller unit 100 may start executing predetermined macro data in response to a press of a button other than those displayed in the display area 502.

(Macro Execution)

FIG. 7 is a flowchart illustrating an exemplary process of the macro execution module 404 in the present exemplary embodiment. This process is realized when the CPU 101 executes the macro execution module 404.

On the list screen 501 (see FIG. 5) displayed in the operation unit 193, when the user presses one of the macro call buttons to execute a specific macro, the user interface module 401 informs the macro acquisition module 402 of macro data corresponding to the button pressed by the user. Then, the macro execution module 404 starts executing the macro data acquired by the macro acquisition module 402. This starts the process shown by the flowchart of FIG. 7.

As shown in the loop of L701 to L707, the macro execution module 404 repeats steps S702 to S706 for all functions described by the macro data 403 acquired by the macro acquisition module 402.

First, in step S702, the macro data described in XML is read out. Then, a job corresponding to a function described by the macro data is created. Specifically, to a software module related to a function to be executed by the macro execution module 404, an instruction to execute the function is issued. For example, in the case of the macro data shown in FIG. 6, a job corresponding to the "image transmission function" is created.

Next, it is determined in step S703 whether the current function to be executed is the last of all functions described by the macro data. If the macro data is described in XML as shown in FIG. 6, the determination in step S703 can be made on the basis of whether there is any other tag for any other function to be executed after the tag for the current function for which the job has been created. For example, if the job created in step S702 corresponds to the process of "read_document" (indicating the scanning of document to be transmitted) (see lines 604 to 608 of FIG. 6), this job is not one for the last function to be executed, since there are the other functions "combine_documents" (indicating the combining of documents) and "send" to be executed after the execution of "read_document". On the other hand, if the job created in step S702 corresponds to the process of "send" (see lines 612 to 615 of FIG. 6), this job is one for the last function to be executed, since there is no other function to be executed after the execution of "send".

If it is determined in step S703 that the current function to be executed is the last one, the job created in step S702 is executed in step S706. If this job is related to the image transmission function and "Don't output a transmission report" is not selected as the report output setting 208, a transmission report is output according to the report output setting 208 after the execution of the job.

On the other hand, if it is determined in step S703 that the current function to be executed is not the last one, the process proceeds to step S704, where it is determined whether the job created in step S702 is one related to the image transmission function, that is, an image transmission job.

If it is determined in step S704 that the job created in step S702 is not an image transmission job, the process proceeds to step S706, where the job created in step S702 is executed. On the other hand, if it is determined in step S704 that that the job created in step S702 is an image transmission job, the process proceeds to step S705, where the job attribute of the image transmission job created in step S702 is set to "Don't output a transmission report". Then, the process proceeds to step S706, where the image transmission job is executed. A job attribute is attribution information that can be set for a created job and is effective only for the created job. The job attribute is stored in the RAM 102 or HDD 104 until execution of the created job is completed. A job attribute has a higher priority over information preset in the MFP 1 for job execution. In other words, even when "Output a transmission report" is selected as the report output setting 208, if the attribute of the image transmission job is set to "Don't output a transmission report" in step S705, the report generation control module 207 in the image transmission module 200 gives a priority to this job attribute and performs control such that no transmission report is printed after the execution of the image transmission job.

(Generation of Transmission Report)

Figure 8:
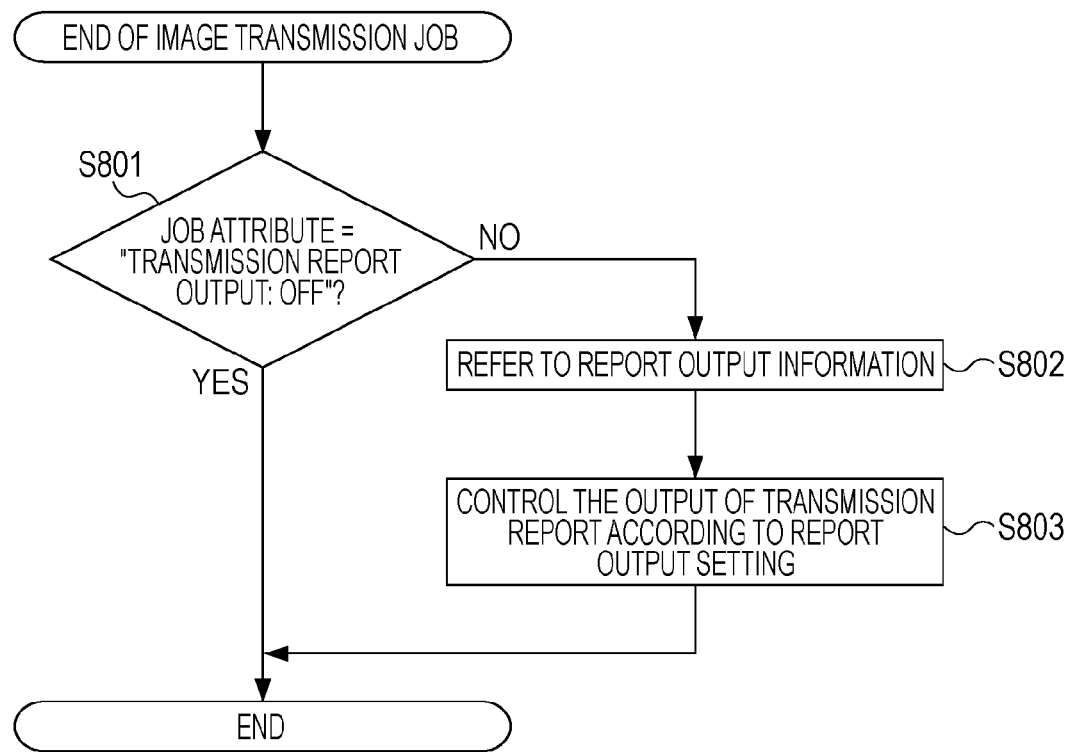
FIG. 8 is a flowchart illustrating an exemplary process of a report generation control module.

FIG. 8 is a flowchart illustrating an exemplary process of the report generation control module 207 in the present exemplary embodiment. This process is realized when the CPU 101 executes the report generation control module 207.

After execution of the image transmission job created by the macro execution module 404 is completed, the report generation control module 207 starts a report generation process. In step S801, it is determined whether "Don't output a transmission report" is set as the job attribute of the image transmission job.

If it is determined in step S801 that "Don't output a transmission report" is set as the job attribute, the report generation control module 207 terminates the process of FIG. 8 without generating a transmission report, regardless of the setting in the report output setting 208.

On the other hand, if it is determined in step S801 that "Don't output a transmission report" is not set as the job attribute, which means that if the macro execution module 404 does not disable (or if the macro execution module 404 permits) the output of a transmission report, the process proceeds to step S802, where the report output setting 208 stored in the HDD 104 is referenced.

Then, in step S803, the report generation control module 207 controls the output of a transmission report according to one of the setting options, "Output a transmission report after execution of an image transmission job regardless of the result of the image transmission", "Output a transmission report only in case of error in image transmission", and "Don't output a transmission report" selected in the report output setting 208. Then, the process of FIG. 8 ends.

Independently of the execution of macro data, the user may directly select the function "local box transmission" using the operation unit 193 to cause an image transmission job for "local box transmission" to be created in the MFP 1. In this case, after execution of this image transmission job is completed, the report generation control module 207 controls the output of a transmission report according to the setting in the report output setting 208.

When the processes of FIGS. 7 and 8 are executed, a transmission report is output only for the image transmission job executed last. In other words, no transmission report is output for any image transmission job input from the macro execution module 404 other than the image transmission job executed last. Therefore, it is possible to prevent unnecessary printing and reduce costs involved in operating the MFP 1.

Second Exemplary Embodiment

In the first exemplary embodiment, as described with reference to the flowchart of FIG. 7, a determination as to whether the current function is not the last function to be executed is made by referring to the macro data 403 and thus, an image transmission job for which there is no need to output a transmission report is identified. In the second exemplary embodiment, an image transmission job which does not require the output of a transmission report can be identified by a method different from that of the first exemplary embodiment.

A configuration of an MFP which is an exemplary multi-function image processing apparatus of the second exemplary embodiment is similar to that of the MFP 1 of the first exemplary embodiment and thus, the description thereof is omitted.

Like the MFP 1 of the first exemplary embodiment, the MFP 1 of the second exemplary embodiment is capable of performing the image transmission function. The image transmission function provides a plurality of transmission modes using different image transmission protocols. The transmission modes include "facsimile", "Internet facsimile", "e-mail transmission" for transmitting image data as an attachment to an e-mail message, "SMB transmission" using the SMB protocol, "WebDAV transmission" using the WebDAV protocol, and "local box transmission" for storing image data in the internal HDD 104 of the MFP 1.

Of these transmission modes, "facsimile", "Internet facsimile", "e-mail transmission", "SMB transmission", and "WebDAV transmission" are controlled such that after execution of the corresponding image transmission job, a transmission report is output on the basis of the report output setting 208.

However, when an image transmission job corresponding to "local box transmission" is created by executing macro data, the job attribute of this image transmission job is set to "Don't output a transmission report". Therefore, no transmission report is output after execution of the image transmission job for "local box transmission".

Generally, macro data is generated such that jobs are executed in order of "image input job" for inputting an image, "image processing job" for processing an image, and "image output job" for outputting an image. The above-described "facsimile", "Internet facsimile", "e-mail transmission", "SMB transmission", and "WebDAV transmission" all involve transmission of image data outside the MFP 1 and thus are categorized as "image output job", which is executed last. On the other hand, "local box transmission" involves a process in which a document image is read by the scanner unit 191 and stored in the HDD 104, and thus is categorized as "image input job". This means that there is no case where "local box transmission" is executed at the end of the macro data. Therefore, when an image transmission job for "local box transmission" is created, the job attribute of this image transmission job is set to "Don't output a transmission report" so that no unnecessary transmission report is output after execution of the job.

(Macro Execution in Second Exemplary Embodiment)

FIG. 9 is a flowchart illustrating a process of the macro execution module 404 in the second exemplary embodiment. This process is realized when the CPU 101 executes the macro execution module 404.

On the list screen 501 (see FIG. 5) displayed in the operation unit 193, when the user presses one of the macro call buttons to execute a specific macro, the user interface module 401 informs the macro acquisition module 402 of macro data corresponding to the button pressed by the user. Then, the macro execution module 404 starts executing the macro data acquired by the macro acquisition module 402. This starts the process shown by the flowchart of FIG. 9.

As shown in the loop of L901 to L906, the macro execution module 404 repeats steps S902 to S905 for all functions described by the macro data 403 acquired by the macro acquisition module 402.

First, in step S902, a job is created for a function to be executed. This process is not described in detail here, as it is substantially the same as that in step S702 of FIG. 7.

In step S903, it is determined whether the created job is for "local box transmission". If it is so, the process proceeds to step S904 and if it is not, the process proceeds to step S905.

In step S904, the job attribute of the job created in step S902 is set to "Don't output a transmission report". No detailed description of the job attribute will be given here, as it is already given in the first exemplary embodiment.

In step S905, the job created in step S902 is executed. This process is not described in detail here, as it is substantially the same as that in step S706 of FIG. 7.

The macro execution module 404 sequentially executes steps S902 to S905 for all functions described by the macro data 403. Upon completion of this execution, the process exits the loop of L901 to L906 and ends.

After execution of the image transmission job (see FIG. 9) on the basis of the image transmission function described by the macro data 403, the report generation control module 207 performs a process for outputting a transmission report. The procedure of this process will not be described in detailed here, as it is substantially the same as that described with reference to the flowchart of FIG. 8.

Independently of the execution of macro data, the user may directly select the function "local box transmission" using the operation unit 193 to cause an image transmission job for "local box transmission" to be created in the MFP 1. In this case, after execution of this image transmission job is completed, the report generation control module 207 controls the output of a transmission report according to the setting in the report output setting 208.

As described above, of functions described by the macro data 403, "local box transmission" is not the function to be executed last. Therefore, in the second exemplary embodiment, the report generation control module 207 performs control such that no transmission report is output after the execution of "local box transmission". This makes it possible to prevent unnecessary printing and reduce costs involved in operating the MFP 1.

In the first and second exemplary embodiments described above, control as to whether a transmission report is to be output is performed according to whether a job created by the macro execution module 404 is an image transmission job. However, the present invention is not limited to this. Besides the image transmission job, if there is a job for which a result of execution thereof is to be output, control as to whether such a result is to be output may be performed.

Although a transmission report is output as a printed report in the first and second exemplary embodiments described above, the present invention is not limited to this. For example, such a transmission report may be displayed in the operation unit 193 or may be sent via e-mail. In such cases, control as to whether a transmission report is to be output is performed with respect to various means for outputting a transmission report.

Additionally, although the macro data 403 is stored in the internal HDD 104 of the MFP 1 in the first and second exemplary embodiments, the present invention is not limited to this. For example, the macro data 403 stored in an external information device connected to the MFP 1 via the LAN 111 may be referred to and used.

Other Exemplary Embodiments

The present invention described with reference to various exemplary embodiments is applicable to either a system constituted by a plurality of devices or an apparatus constituted by a single device. Examples of such an apparatus include a scanner, a printer, a personal computer (PC), a copier, an MFP, and a facsimile.

The present invention can be realized when a control program for performing the functions of the above-described exemplary embodiments is directly or remotely supplied to a system or an apparatus, and a computer included in the system or apparatus reads and executes program code of the supplied program.

Therefore, the program code of the control program installed on the computer or apparatus for realizing functions and processes of the present invention in the computer or apparatus also realizes the present invention. In other words, the control program for realizing the functions and processes of the present invention also constitutes the present invention.

In this case, the control program may take any form as long as it serves as a program. Examples of possible forms of the program include object code, a program executed by an interpreter, and script data supplied to an OS.

Examples of a recording medium for supplying the program include a flexible disk, a hard disk, an optical disk, a magneto-optical (MO) disk, a compact-disk read-only memory (CD-ROM), a CD-recordable (CD-R), a CD-rewritable (CD-RW), a magnetic tape, a nonvolatile memory card, a ROM, and a digital versatile disk (DVD) (e.g. DVD-ROM or DVD-R).

The program may be downloaded from an Internet or intranet website using a browser on a client computer. That is, the computer program of the present invention or a file created by compressing the program and having an automatic installation function may be downloaded from the website to a recording medium, such as a hard disk. Alternatively, program code included in the program of the present invention may be divided into a plurality of files, which are then downloaded from different websites. Therefore, a World Wide Web (WWW) server that allows a plurality of users to download program files for realizing the functions and processes of the present invention may also constitute the present invention.

The program of the present invention may be encrypted, stored in a storage medium, such as a CD-ROM, and distributed to users. In this case, only users who satisfy predetermined conditions may be allowed to download key information for decrypting the encrypted program from a website via the Internet or intranet. Then, the users decrypt the encrypted program using the key information, execute the decrypted program, and install the program on a computer.

The functions of the above-described exemplary embodiments may be performed when a computer reads and executes the program. Alternatively, on the basis of instructions of the program, an OS running on the computer may carry out all or part of the actual process. This also allows the functions of the above-described exemplary embodiments to be performed.

The functions of the above-described exemplary embodiments may be performed when the program read out of a recording medium is written to a function expansion board in a computer or to a memory of a function expansion unit connected to a computer and then, on the basis of instructions of the program, the function expansion board or a CPU in the function expansion unit carries out all or part of the actual process.

The present invention has been described with reference to exemplary embodiments. However, it is to be understood that the invention is not limited to the disclosed exemplary embodiments, but various modifications can be made within the scope of the claims.

This application claims the benefit of Japanese Application No. 2007-044005 filed Feb. 23, 2007, which is hereby incorporated by reference herein in its entirety.

What is claimed is:

1. A multifunction image processing apparatus having a plurality of functions including an image transmission function, the apparatus comprising:

a job execution unit configured to execute a job for any of the plurality of functions;

an output unit configured to output result information after the job execution unit executes a job for the image transmission function, the result information containing information indicating a result of the execution of the job;

a macro execution unit configured to cause the job execution unit to execute a plurality of jobs on the basis of macro data indicating more than one function of the plurality of functions and an order of executing the more than one function of the plurality of functions, wherein each of the plurality of jobs is executed for the same image data on the basis of the macro data; and a control unit configured to cause the output unit not to output the result information after the job of the plurality of jobs is executed if the job of the plurality of jobs is for executing the image transmission function and there is another job to be executed based on the macro data after the execution of the image transmission function.

2. The multifunction image processing apparatus according to claim 1, wherein the control unit allows the output unit to output the result information after the job of the plurality of jobs is executed if the job is for executing the image transmission function and the macro data indicates that there is no function to be executed after the execution of the image transmission function.

3. The multifunction image processing apparatus according to claim 1, further comprising:

a storage unit configured to store a report output setting for specifying whether the output unit should output the result information after the execution of the job for the image transmission function, wherein when the job execution unit executes an image transmission job for which a job attribute indicating that no result information is to be output is set, the output unit does not output the result information regardless of the report output setting stored in the storage unit.

4. The multifunction image processing apparatus according to claim 1, wherein the plurality of functions includes a copying function, a scanning function, a printing function, and a local box transmission function.

5. A multifunction image processing apparatus having a plurality of functions including an image transmission function, the apparatus comprising:

a job execution unit configured to execute a job for any of the plurality of functions;

an output unit configured to output result information after the job execution unit executes a job for the image transmission function, the result information containing information indicating a result of the execution of the job;

a macro execution unit configured to cause the job execution unit to execute a plurality of jobs on the basis of macro data indicating more than one function of the plurality of functions and an order of executing the more than one function of the plurality of functions, wherein each of the plurality of jobs is executed for the same image data on the basis of the macro data;

a storage unit configured to store image data; and a control unit configured to cause the output unit not to output the result information after a job of the plurality of jobs is executed if the job of the plurality of jobs is for the image transmission function of transmitting image data to the storage unit.

6. The multifunction image processing apparatus according to claim 5, wherein the control unit allows the output unit to output the result information after the job of the plurality of jobs is executed if the job of the plurality of jobs is for the image transmission function of transmitting image data to an external terminal.

7. A method of controlling a multifunction image processing apparatus having a plurality of functions including at least an image transmission function and comprising a job execution unit configured to execute a job for any of the plurality of functions and an output unit configured to output result information after the job execution unit executes a job for the image transmission function, the result information containing information indicating a result of the execution of the job, the method comprising:
   executing a plurality of jobs on the basis of macro data indicating more than one function of the plurality of functions and an order of executing the more than one function of the plurality of functions, wherein each of the plurality of jobs is executed for the same image data on the basis of the macro data; and
   instructing the output unit not to output the result information after the job of the plurality of jobs is executed if the job of the plurality of jobs is for executing the image transmission function and there is another job to be executed based on the macro data after the execution of the image transmission function.

8. A method of controlling a multifunction image processing apparatus having a plurality of functions including at least an image transmission function and comprising a job execution unit configured to execute a job for any of the plurality of functions and an output unit configured to output result information after the job execution unit executes a job for the image transmission function, the result information containing information indicating a result of the execution of the job, the method comprising:
   executing a plurality of jobs on the basis of macro data indicating more than one function of the plurality of functions and an order of executing the more than one function of the plurality of functions, wherein each of the plurality of jobs is executed for the same image data on the basis of the macro data; and
   instructing the output unit not to output the result information after the job of the plurality of jobs is executed if the job of the plurality of jobs is for the image transmission function of transmitting image data to a storage unit included in the multifunction image processing apparatus.

9. A non-transitory storage medium storing a control program for executing a method of controlling a multifunction image processing apparatus having a plurality of functions including at least an image transmission function and comprising a job execution unit configured to execute a job for any of the plurality of functions and an output unit configured to output result information after the job execution unit executes a job for the image transmission function, the result information containing information indicating a result of the execution of the job, the method comprising:
   executing a plurality of jobs on the basis of macro data indicating more than one function of the plurality of functions and an order of executing the more than one function of the plurality of functions, wherein each of the plurality of jobs is executed for the same image data on the basis of the macro data; and
   instructing the output unit not to output the result information after the job of the plurality of jobs is executed if the job of the plurality of jobs is for executing the image transmission function and there is another job to be executed based on the macro data after the execution of the image transmission function.

10. A non-transitory storage medium storing a control program for executing a method of controlling a multifunction image processing apparatus having a plurality of functions including at least an image transmission function and comprising a job execution unit configured to execute a job for any of the plurality of functions and an output unit configured to output result information after the job execution unit executes a job for the image transmission function, the result information containing information indicating a result of the execution of the job, the method comprising:
   executing a plurality of jobs on the basis of macro data indicating more than one function of the plurality of functions and an order of executing the more than one function of the plurality of functions, wherein each of the plurality of jobs is executed for the same image data on the basis of the macro data; and
   instructing the output unit not to output the result information after the job of the plurality of jobs is executed if the job of the plurality of jobs is for the image transmission function and for executing image transmission directed to a storage unit included in the multifunction image processing apparatus.

\* \* \* \* \*